Dec. 19, 1933.　　　　　G. J. EARNEST　　　　　1,940,643
VEHICLE BRAKE
Filed Sept. 16, 1932　　　2 Sheets-Sheet 1

George J. Earnest,
INVENTOR.

BY J. Stanley Busch
ATTORNEY.

Dec. 19, 1933.  G. J. EARNEST  1,940,643
VEHICLE BRAKE
Filed Sept. 16, 1932  2 Sheets-Sheet 2
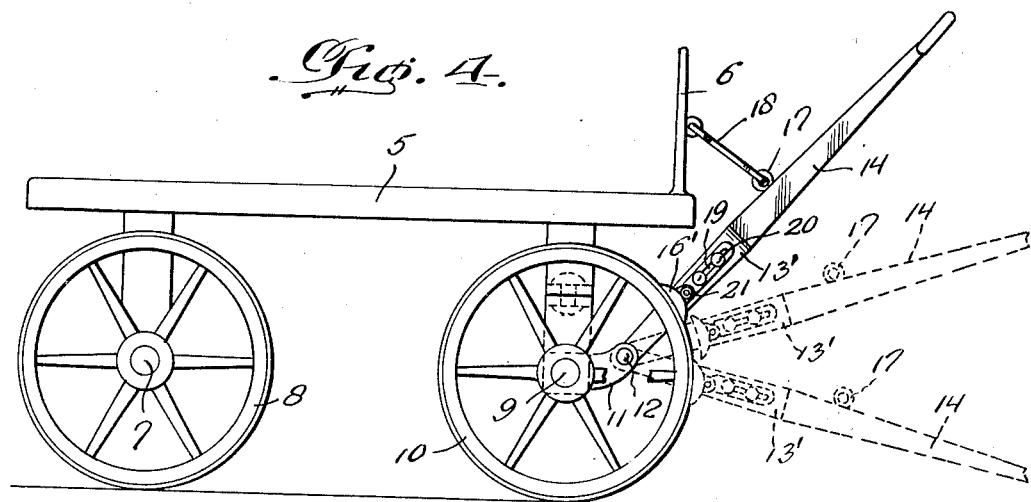
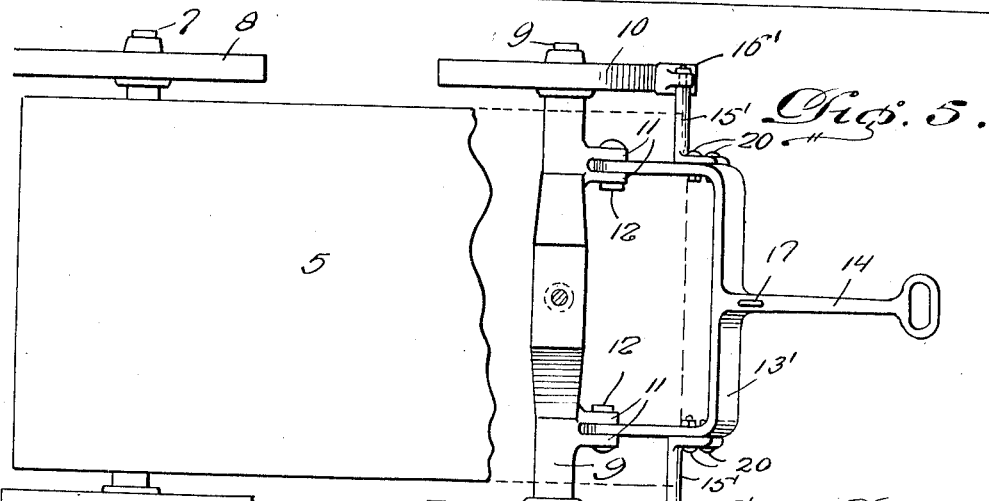
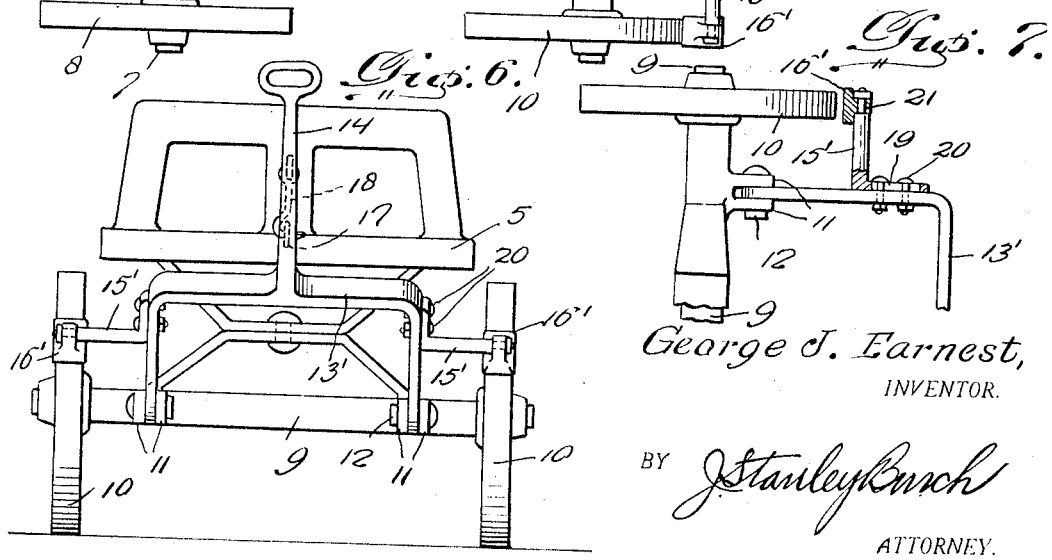
George J. Earnest,
INVENTOR.
BY J. Stanley Burch
ATTORNEY.

Patented Dec. 19, 1933

1,940,643

UNITED STATES PATENT OFFICE 1,940,643

VEHICLE BRAKE

George J. Earnest, Klamath Falls, Oreg., assignor of ten per cent to James E. Newnham, and forty per cent to David R. Vandenberg, both of Klamath Falls, Oreg.

Application September 16, 1932
Serial No. 633,505

2 Claims. (Cl. 188—119)

This invention relates to brakes for vehicles having a tongue or handle for pulling the same, such as trucks for hauling baggage and express packages at railroad stations and the like.

The primary object of the present invention is to provide a simple, durable and efficient construction whereby brake shoes will be engaged with the front wheels of the vehicle to prevent movement of the latter when the tongue or handle is swung to and secured in an upward inoperative position, but will be released from the wheels when the tongue or handle is partially lowered to a substantially horizontal operative position.

A further object is to provide a construction of the above character in which the brake shoes may be adjusted for use in connection with trucks having wheels of different diameters.

Still further objects are to adapt the brake shoes to also engage the wheels in case the tongue or handle should be carelessly dropped and left in a fully lowered inoperative position, and to tiltably mount the brake shoes for swinging into fully engaged relation to the wheels in both the raised and the lowered inoperative positions of the tongue or handle.

Other objects and features of the invention will become apparent from the following description when considered in connection with the accompanying drawings, in which:—

Figure 4 is a view similar to Figure 1, showing a modification of the invention.

Figure 5 is a view similar to Figure 2 of the construction shown in Figure 4.

Figure 6 is a view similar to Figure 3 of the construction of Figure 4; and

Figure 7 is a detail view, partly in plan and partly in section, showing the manner of mounting the brake shoes in the construction of Figure 4.

Figure 1:
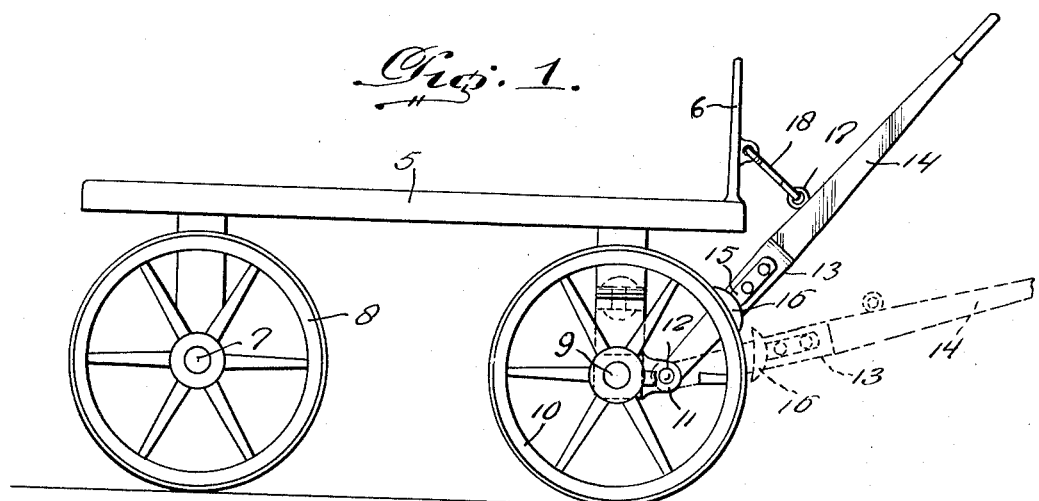
Figure 1 is a side elevation of a baggage truck having a brake constructed in accordance with the present invention.
Figure 2:
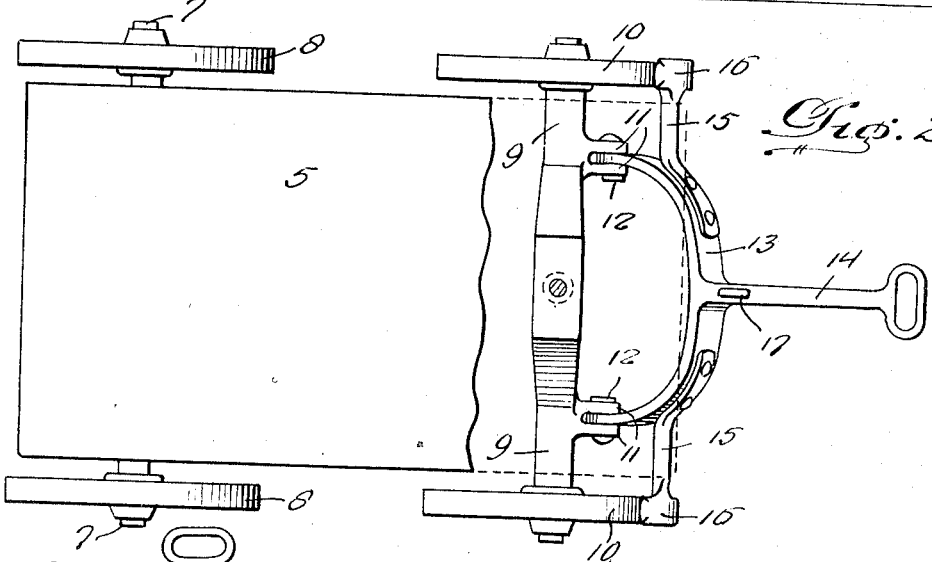
Figure 2 is a view thereof, partly in top plan and partly broken away and in section.
Figure 3:
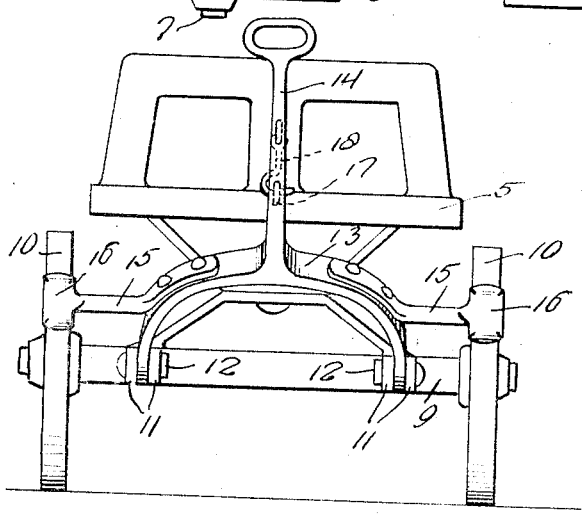
Figure 3 is a front elevation of the same.

Referring in detail to the drawings, 5 indicates the floor and 6 the upstanding front wall of a baggage truck body, the latter being mounted on a rear axle 7 having supporting wheels 8 journaled thereon and a horizontally swinging front steering axle 9 having supporting wheels 10 journaled thereon. Projecting forwardly from and integral with the front axle 9 adjacent and inwardly of the wheels 10 are pairs of spaced ears 11 between which are pivoted at 12 the ends of a U-shaped yoke 13 rigid with the rear end of a handle 14 used to pull the truck, whereby the handle and yoke are adapted to swing vertically.

Angular brackets 15 are rigidly secured on opposite sides of the yoke 13 so as to project laterally outwardly toward and in front of the wheels 10 and brake shoes 16 are carried by the free outer ends of these brackets in position to engage the tires of wheels 10 when the handle and yoke are swung upwardly to the full line inoperative position of Figures 1 and 4 to prevent movement of the truck, and to move out of engagement with such wheels when the handle and yoke are partially lowered to a substantially horizontal operative position as indicated by dotted lines. This action is due to pivoting the yoke 13 forwardly of axle 9 so that brake shoes 16 move about an axis eccentric to that of wheels 10. An eye member 17 is provided on the upper side of handle 14 intermediate its ends to be engaged by a hinged hasp 18 provided on the front wall 6 of the truck body to releasably hold the handle 14 in its raised inoperative position with the brake shoes engaged with the wheels 10.

In the construction of Figures 4 to 7 inclusive, the brackets have longitudinal elongated slots 19 in the inner arms thereof through which extend bolts 20 for securing the brackets to the yoke for adjustment toward or from the pivots 12, whereby the brake shoes may be positioned at various distances from the axle 9 to properly engage the front wheels of trucks even though the wheels may vary in diameter. Also, as shown in these figures, the brake shoes may be adapted to also engage the wheels 10 in case the handle should be carelessly dropped and left in a fully lowered inoperative position, and in order that the brake shoes 16' may fully engage the wheels in both the raised and the lowered inoperative positions of the handle, they are tiltably mounted or journaled as at 21 on the outer ends of the brackets 15' for automatically swinging into fully engaged relation to the wheels. In this construction, the yoke 13' is rigid with the rear end of handle 14 and is pivoted at its ends between ears 11 as at 12. Also, the brackets 15' are rigidly secured on opposite sides of yokes 13'.

From the above description, it is believed that the construction, operation, utility and advantages of the present invention will be apparent to those skilled in the art. Minor changes and further modifications may be made without depart-

What I claim as new is:

1. In combination, a vehicle body including a floor and an upstanding front wall and mounted on a rear axle having supporting wheels journaled thereon and a horizontally swinging front steering axle having supporting wheels journaled thereon, said front axle having pairs of spaced integral ears projecting forwardly therefrom adjacent and inwardly of the last-named wheels, a tongue or handle having a U-shaped yoke rigid with the rear end thereof, the ends of said yoke being pivoted between the pairs of ears of said front axle to permit the handle and yoke to swing vertically, angular brackets rigidly secured on opposite sides of the yoke and projecting laterally outwardly toward and in front of said last-mentioned wheels, brake shoes carried by the free outer ends of said brackets in position to engage the tires of the last-mentioned wheels when the handle and yoke are swung upwardly to an inoperative position and to move out of engagement with such wheels when the handle and yoke are partially lowered to a substantially horizontal operative position, an eye member carried by the upper side of the handle intermediate its ends, and means to releasably hold the handle in its raised inoperative position with the brake shoes engaged with the adjacent wheels, said brake shoes being tiltably mounted on the brackets to freely swing into fully engaged relation to the wheels when the handle and yoke are moved to the raised inoperative position or to a fully lowered inoperative position.

2. In combination, a vehicle having a horizontally swinging front steering axle with supporting wheels journaled thereon, a tongue or handle pivotally connected to said front axle for vertical swinging movement about a horizontal axis disposed forwardly of said front axle, said tongue or handle including a rigid U-shaped rear yoke member, angular brackets rigidly secured on opposite sides of said yoke member and adjustable relative to the latter toward and from said axle parallel with the longitudinal axis of the vehicle, said brackets projecting laterally outwardly toward and in front of said supporting wheels, brake shoes carried by the free outer ends of said brackets in position to engage the tires of said wheels when the handle and yoke are swung upwardly to an inoperative position and to move out of engagement with such wheels when the handle and yoke are partially lowered to a substantially horizontal operative position, and means to releasably hold the handle and yoke in its upwardly swung inoperative position with the brake shoes engaged with said wheels, said brake shoes being tiltably mounted on the brackets to freely swing into fully engaged relation to the wheels when the handle and yoke are moved to the raised inoperative position or to a fully lowered inoperative position.

GEORGE J. EARNEST.